Jan. 30, 1968  G. PETER  3,366,254
TRANSFER DEVICE FOR A VEHICLE PARKING PLANT
Filed June 21, 1965  4 Sheets-Sheet 1
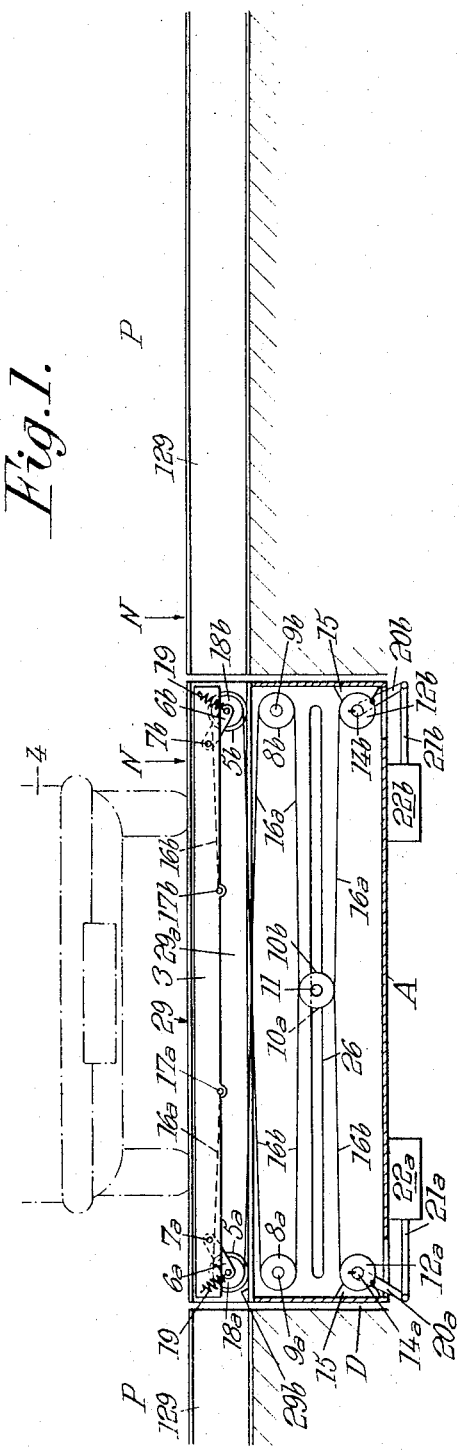
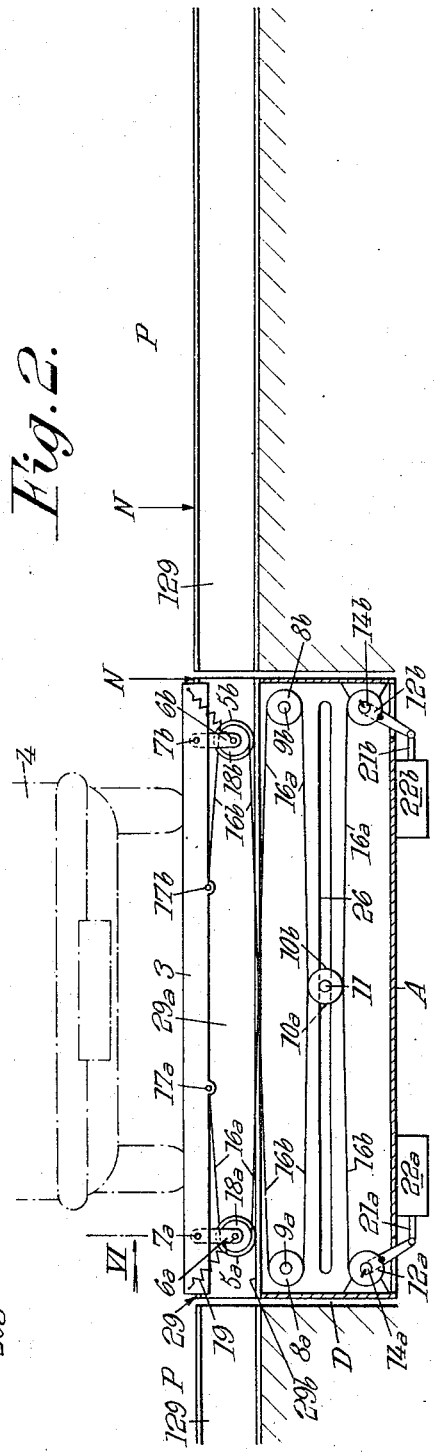

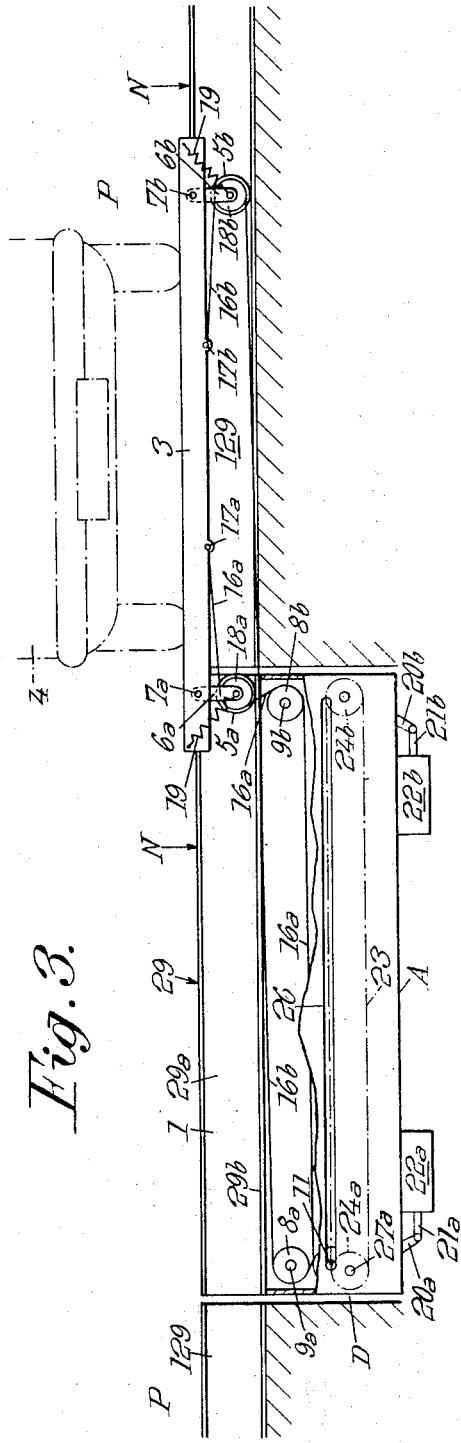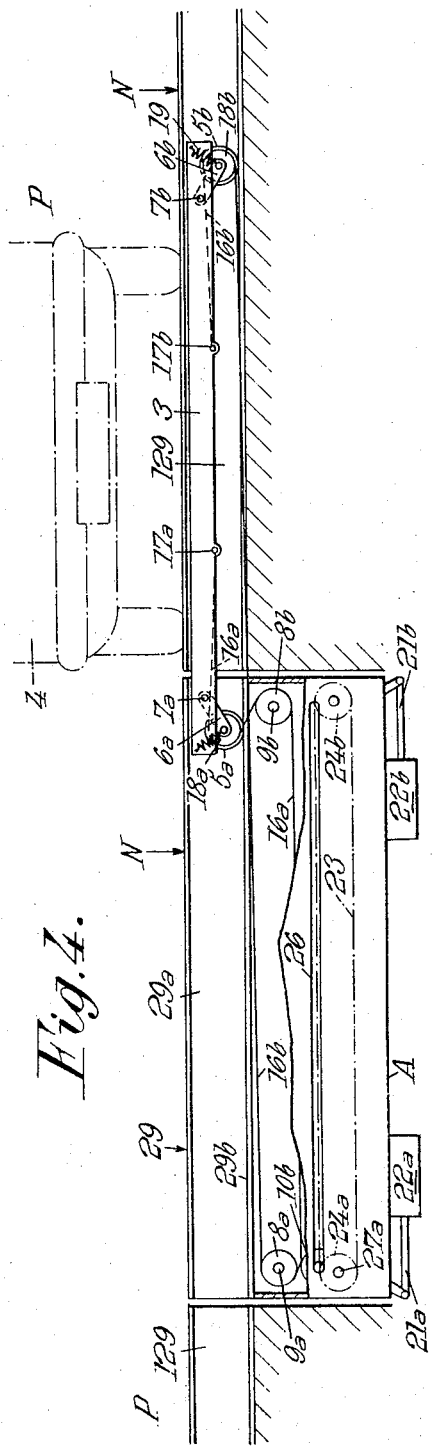

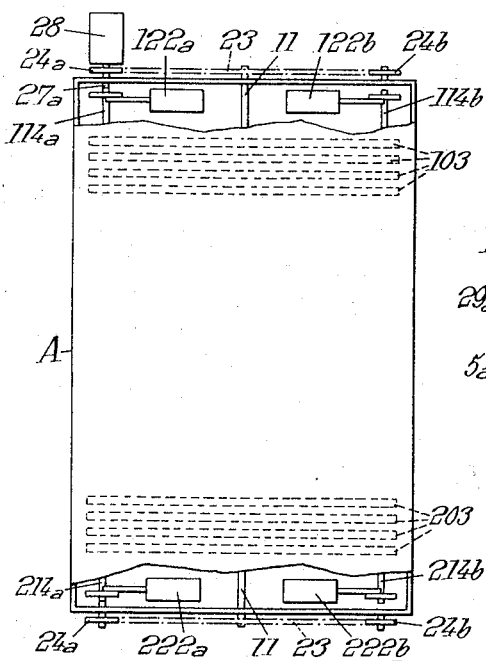
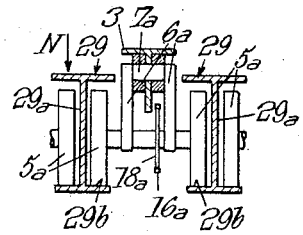
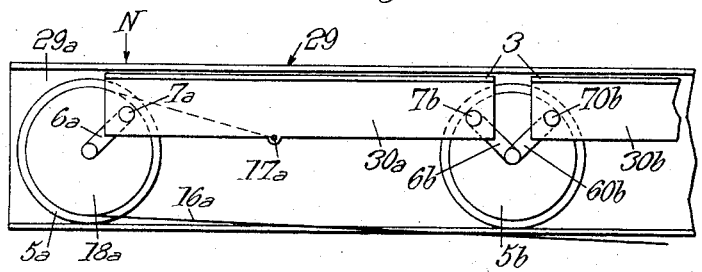

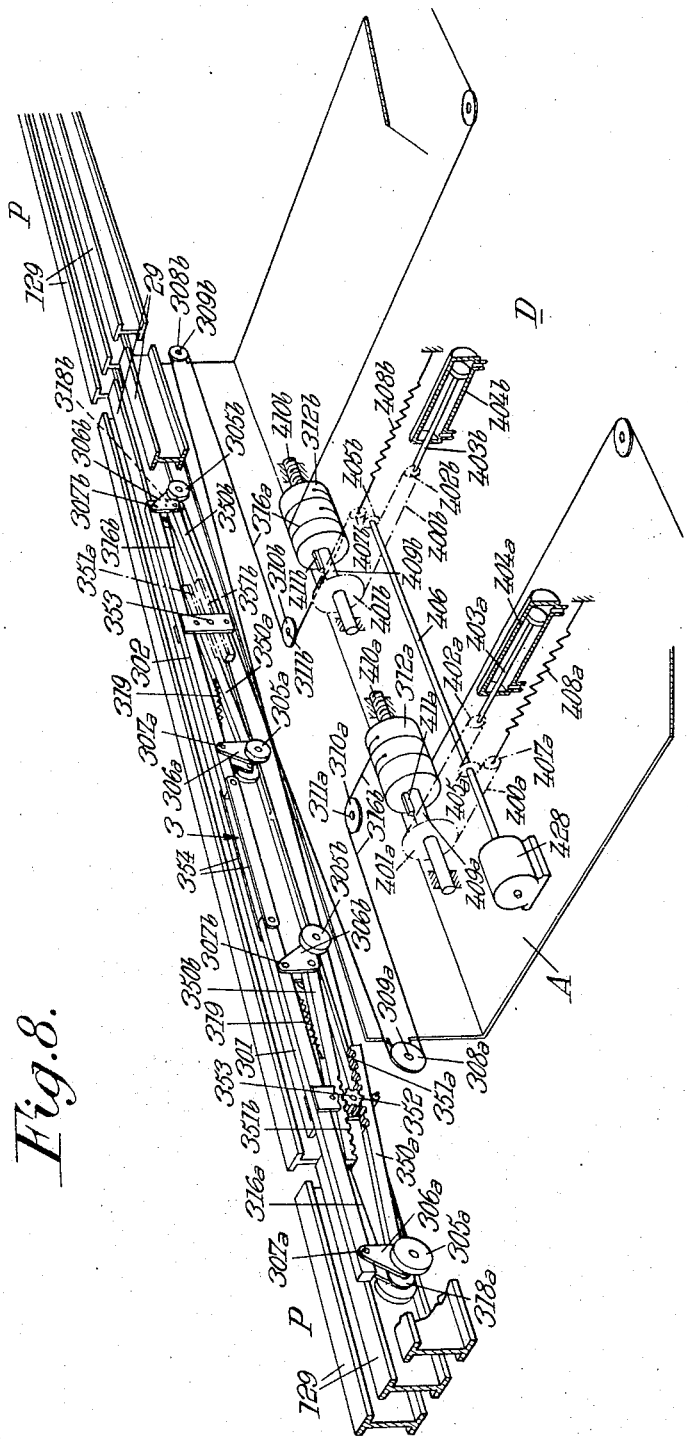

United States Patent Office 3,366,254
Patented Jan. 30, 1968

3,366,254
TRANSFER DEVICE FOR A VEHICLE
PARKING PLANT
Gilbert Peter, 87 Rue du Garde Chasse, Les Lilas, France
Filed June 21, 1965, Ser. No. 465,386
Claims priority, application France, May 9, 1965,
979,643
4 Claims. (Cl. 214—16.1)

ABSTRACT OF THE DISCLOSURE

A vehicle parking plant comprising a plurality of parking areas comprising a vehicle conveying carriage provided with transfer elements adapted to occupy either a lower position where they do not project above the carriage top level or an upper position where they project above said level, said transfer elements being movable with a translatory movement on either side of the carriage, each transfer element including two rigid bars in line with each other and interconnected by a link, said bars being parallel to the direction of transfer, the carriage comprising a plurality of parallel I-section girders having their webs in vertical planes and the parking areas being constituted of girders identical to said carriage girders and in line therewith when the carriage is opposite a parking area, every transfer element, located between two consecutive carriage girders being provided with at least two pairs of rollers, the two rollers of a pair rolling respectively on the upper face of the lower flange of one of said girders and on the upper face of the lower flange of the other of said girders.

---

The present invention relates to vehicle parking plants comprising a plurality of parking areas along each of which can be brought a carriage for conveying a vehicle to one of said parking areas, or therefrom, said carriage being provided with transfer elements for shifting vehicles from the carriage to a parking area or inversely, said transfer elements being adapted to occupy either of two positions with respect to the carriage, to wit a lower position wherein said transfer elements do not project above the top level of the carriage and an upper position wherein said transfer elements project above the top level of the carriage, said transfer elements further being movable with a translatory motion on either side of the carriage to come onto a parking area.

The invention is more especially adapted to the case where the vehicles are automobile vehicles.

The object of the invention is to provide a parking plant which is better adapted to meet the requirements of practice than those known at the present time.

For this purpose, in a plant according to the present invention, on the one hand, the carriage comprises, at least in the portion thereof where the transfer elements are located, a plurality of parallel I-section girders having their webs in vertical planes and, on the other hand, the parking areas, at least in the portions thereof where the transfer elements can be brought by translation, are constituted by girders identical to the carriage girders and disposed so as to be in line with said carriage girders when the carriage is brought opposite the parking area that is considered, every transfer element being then located between two consecutive carriage girders and provided with at least two pairs of rollers, the two rollers of a pair rolling respectively on the upper face of the lower flange of one of said girders and on the upper face of the lower flange of the other of said girders.

Preferred embodiments of the present invention will be hereinafter described with reference to the appended drawings, given merely by way of example, and in which:

FIGS. 1, 2, 3 and 4 show in elevational view, partly in vertical section, the chief elements of a first embodiment of a parking plant according to the present invention, said elements being shown in different relative positions they occupy during the operation of the plant;

FIG. 5 is a bottom view, with parts cut away, of an element of the parking plant, made according to a modification;

FIG. 6 is a part section on the line VI—VI of FIG. 2;

FIG. 7 is a part elevational view of another embodiment of the invention;

FIG. 8 is an elevational view with portions cut away of another embodiment of the invention.

The present invention relates to a parking plant for automobile vehicles comprising a plurality of parking areas P preferably opposed two by two and located on either side of a space D in which can be displaced, vertically and/or horizontally, a carriage A which, under the action of driving means that have not been shown, may be brought opposite any of said parking areas P.

As shown by FIGS. 1, 2, 3 and 4, transfer elements 3 are provided in carriage A, these transfer elements 3 being provided to shift a motor vehicle 4 from carriage A to a parking area P or, inversely from a parking area P to carriage A.

Mechanical means, which will be hereinafter described, are provided for operating transfer elements 3 so that they can:

On the one hand, occupy either a lower position wherein they do not project above the top level N of carriage A (FIG. 1), or a higher position wherein they project above the top level N of carriage A (FIG. 2), and On the other hand, move with a translatory motion on either side of carriage A so as to come into one of the parking areas P (FIGS. 3, 4).

Carriage A is made, at least in the portion thereof where transfer elements 3 are housed, of girders 29 of I-shaped cross section, said girders 29 extending parallel to one another and being disposed with their webs 29a vertical.

Parking areas P are constituted, at least in the portions thereof where transfer elements 3 can be brought by translatory displacement, of girders 129 identical to the girders 29 of carriage A, arranged in such manner as to form extensions thereof when carriage A has been brought opposite the parking area P that is considered.

Every transfer element 3 is housed in carriage A between two consecutive girders 29 and it is provided with at least two pairs of rollers 5a, 5b, the two rollers of each pair running respectively upon the upper face of the lower flange 29a of one of said girders 29 and upon the upper face of the lower flange 29b of the other of said girders 29.

It should be pointed out that, in the example that is more especially considered of parking plants for automobile vehicles, the arrangement of girders 29 on carriage A and of girders 129 on parking areas P depends upon the manner in which the vehicles are to be parked.

For parking the vehicles by transverse displacement thereof, the arrangement of girders 29 upon carriage A, and of girders 129 on parking areas P, depends upon the average axle base of the vehicles (a set of girders for the front wheels of the vehicle and a set of girders for the rear wheels).

When the vehicles are parked by longitudinal displacements thereof the disposition of girders 29 depends upon the average track width of the vehicles (one series of girders for the right hand wheels and the other series for the left hand wheels).

It will be understood that when the vehicles are parked by being moved transversely, the transfer elements are relatively short with respect to the length of the transfer elements used in the case of longitudinal parking of the vehicles.

In the construction illustrated by FIGS. 1, 2, 3, 4 and 6, every transfer element consists of a rigid bar provided with two pairs of rollers, to wit one pair of rollers 5a disposed in the vicinity of one of the ends of the bar 3 that is considered, and one pair of rollers 5b disposed in the vicinity of the other end of said bar 3.

These two pairs of rollers 5a and 5b are mounted on the corresponding bar 3 through arms 6a (for the pair of rollers 5a) and 6b (for the pair of rollers 5b) pivoted respectively about horizontal pins 7a and 7b perpendicular to the webs of girders 29.

The means for shifting transfer elements 3 from their lower positions to their upper positions, or inversely, and the means for shifting said transfer elements horizontally from carriage A to a parking area P, or inversely, will now be described.

The lifting means for shifting transfer bars 3 vertically are made in the following manner in the embodiment illustrated by FIGS. 1, 2, 3 and 4.

Carriage A comprises, below every transverse bar 3:

First, two wheels 8a and 8b located under the respective ends of transverse bar 3, these two wheels being journalled about axes 9a and 9b carried by carriage A and perpendicular to girders 29;

Secondly, two intermediate wheels 10a and 10b freely rotatable, mounted side by side upon a transfer shaft 11, perpendicular to girders 29, these two intermediate wheels 10a and 10b being located at equal distance from the ends of transfer bars 3 when the latter are located wholly on carriage A, and Thirdly, two control wheels 12a and 12b, located respectively under return wheels 8a and 8b, these two control wheels 12a and 12b being fixed on two control shafts 14a and 14b respectively, perpendicular to girders 29 and supported on carriage A through bearings 15.

The means for lifting or lowering every transfer bar 3 with respect to carriage A are as follows:

On the one hand, there is secured to every transfer bar 3 a cable 16a, at a point 17a located between axes 7a and 7b but nearer to 7a than to 7b, this cable 16a passing successively over a freely rotatable wheel 18a, the return wheel 8b located on the opposite side, and the corresponding intermediate wheels 10b, to be finally secured to the corresponding control wheel 12b.

On the other hand, there is secured to every transfer bar 3, another cable 16b, at a point 17b located between axes 7b and 7a, but nearer to 7b than to 7a, this cable 7b passing successively over a freely rotatable wheel 18b, the return wheel 8a located on the opposite side, and the corresponding intermediate wheel 10a, to be finally secured to the corresponding control wheel 12a.

It will be understood that, if control shafts 14a and 14b are rotatable in the direction tending to wind up cables 16b and 16a respectively upon control wheels 12a and 12b, a pull is exerted on said cables which moves arms 6a and 6b toward the center of transfer elements 3, whereby, as shown by FIG. 2, said arms 6a and 6b pass from their lower position to their upper position.

Inversely, if it is desired to pass transfer elements 3 from their upper position to their lower position, it suffices to release cables 16b and 16a, thus permitting arms 6a and 6b to pivot toward the outside as shown by FIG. 1, under the effect of the weight of the transfer bar 3 and also under the effect of return springs 19.

In order to give control shafts 14a and 14b the rotation movements necessary for performing the operation above described, use is made of hydraulic motors.

For this purpose, as shown by FIGS. 1, 2, 3, 4 and 5, two levers 20a and 20b are fixed respectively to control shafts 14a and 14b, the free ends of said levers being hinged respectively to the rod 21a of the piston of hydraulic motor 22a and to the rod 21b of the piston of hydraulic motor 22b.

Of course, if it is desired to act simultaneously upon the two cables 16a and 16b so that the movements of transfer bars 3 from upper to lower position, or inversely, take place simultaneously, so that said bars remain horizonal, hydraulic motors 22a and 22b must be operated in synchronism.

It should also be noted that it is advantageous, according to a modification illustrated by FIG. 5, to provide two control shafts 114a and 114b for transfer elements 103 intended to act upon the front wheels of the vehicle and two control shafts 214a and 214b for transfer elements 203 intended to act upon the rear wheels of the vehicle.

Two hydraulic motors 122a and 122b drive control shafts 114a and 114b, these two motors being actuated simultaneously.

Two hydraulic motors 222a and 222b drive control shafts 214a and 214b, these two last mentioned hydraulic motors being actuated simultaneously through a hydraulic circuit independent of that for actuating motors 122a and 122b.

Such an arrangement permits of lifting the front or the rear of vehicle 4 substantially perpendicularly to girders 29 and to adjust the position of said vehicle, by producing translation of transfer bars 3, only the portion of the vehicle that is lifted undergoing this translatory movement.

Concerning now the motor means for shifting by translation the transfer elements 3 from carriage A to a parking area P, or inversely, they may consist of a mechanism for moving toward the right or toward the left, perpendicularly to the girders, transfer shaft 11 upon which are freely rotatable the intermediate wheels 10a and 10b.

Owing to such a mechanism, any displacement of transfer shaft 11 toward the left produces, through cables 16a, a translatory movement of twice the amplitude of this displacement of the transfer elements 3 toward the right. Inversely, any displacement of transfer shaft 11 toward the right produces, through cables 16b, a translatory movement of twice the amplitude of this displacement of transfer elements 3 toward the left.

The mechanism above referred to may be constituted, for instance, as shown by FIGS. 3, 4 and 5, by two chains 23 passing over two driving toothed wheels 24a disposed on either side of carriage A and over two freely rotatable toothed wheels 24b also disposed on either side of carriage A. Said two chains 23 are fixed to the respective ends of transfer shaft 11 which is slidable in two horizontal slideways 26, visible in FIGS. 1 to 4, provided in the frame of carriage A.

It therefore suffices to provide a driving shaft 27a capable of rotating in both directions and on which are keyed the two driving toothed wheels 24a. Said shaft may be driven for instance, as shown, by a hydraulic motor 28 (FIG. 5) which, according to the direction in which it is rotating, produces simultaneous displacement of transfer elements 3 toward the right or toward the left.

According to a modification not illustrated by the drawings, the transfer shaft might be made of two portions, one of said portions corresponding to the transfer elements for the front wheels of the vehicle and the other portion corresponding to the transfer elements for the rear wheels of the vehicle, two motors being provided for driving said two portions. This would make it possible:

Either to produce, as in the case of a single motor, a simultaneous translation of all the transfer elements if the movements of the two portions of the transfer shafts are synchronized (either mechanically or electrically), or To produce only translation of the set of transfer elements corresponding to the front wheels, or Again to produce only translation of the set of transfer elements corresponding to the rear wheels, or Again to produce a differential translation of both sets of transfer elements.

Owing to this possibility of independent control of the two series of transfer elements, it is also possible to correct the position of the vehicle upon the carriage so as to bring said vehicle into a position where it is substantially perpendicular to the girders.

I will now consider the case where the vehicles are parked by longitudinal displacement thereof, as illustrated by FIGS. 7 and 8.

In this case, every transfer element 3 consists of a plurality of, i.e. at least two, rigid bars.

Each of said rigid bars rests upon two pairs of rollers connected to said rigid bar through connecting rods which advantageously serve to link together the transfer bar that is considered with the adjacent bars.

For instance, as shown by FIG. 7, portion 30a which constitutes one of the ends of transfer elements 3 is provided, at its left end, with a pair of rollers 5a connected to portion 30a through connecting rods 6a pivoted about axis 7a.

At its right end, portion 30a is provided with a pair of rollers 5b connected, on the one hand, to portion 30a through connecting rods 6b pivoted about axis 7b, and, on the other hand, to the next portion 30b through connecting rods 60b pivoted about axis 70b.

The respective portions 30a, 30b, etc. of transfer element 3 are connected together as above stated concerning the two first portions 30a and 30b.

Concerning now the mechanism for passing a transfer element 3 from its upper to its lower position, or inversely, it may be made similarly to the mechanism above described. As a matter of fact it suffices to move toward each other, through cables 16a and 16b, the connecting rods located at the ends of each of the portions 30a, 30b, etc., to lift the transfer element.

As for the motor means above described for shifting by translation the transfer elements 3 from carriage A to parking areas P, they may be made similarly to the means above described in the case of transfer elements made of a single piece.

It will be noted that the use of transfer elements 3 made of several portions 30a, 30b, etc. is particularly interesting when said transfer elements must be of great length, which is the case for longitudinal parking.

It would also be possible to consider, with such transfer elements 3, the simultaneous parking of several vehicles.

It should be noted that in some cases it is necessary, for constructional reasons (weight, space occupied by the different means) to make use of motor means other than those including a transfer shaft the displacement of which requires a space entirely free below the carriage.

I will now describe, with reference to FIG. 8, a particularly advantageous embodiment of the invention according to which the motor means are arranged to require no free space below the carriage, which permits of simplifying said carriage.

Said FIG. 8 diagrammatically shows in perspective view a portion of a parking plant for automobile vehicles wherein parking takes place longitudinally.

Every transfer element 3 consists of two rigid bars 301 and 302, each provided with two pairs of rollers 305a and 305b respectively located at the ends of the rigid bar.

These two pairs of rollers 305a and 305b are mounted on the rigid bar that is considered through connecting rods 306a for the pair of rollers 305a and 306b for the pair of rollers 305b, respectively pivoted about horizontal axes 307a and 307b perpendicular to the webs of girders 29.

Means, preferably mechanical means, are then provided for positively connecting the pair of rollers 305a and the pair of rollers 305b through their connecting rods.

Such means consist in linking with connecting rods 306a a rod 350a carrying a rack 351a and with connecting rods 306b a rod 350b carrying a rack 351b, the two racks 351a and 351b meshing with a pinion 352 freely rotatable about an axis 353 carried by the rigid bar 301 or 302 that is considered.

The two rigid bars 301 and 302 are connected together through the horizontal connecting rod 354.

The means for shifting transfer elements 3 from their upper to their lower position or inversely are made as follows:

Carriage A is provided, under every transfer element 3, with the following means:

On the one hand, two return wheels 308a and 308b located in the vertical planes, respectively, of the end portions of transfer element 3, these two return wheels 308a and 308b rotating respectively abouet axes 309a and 309b carried by carriage A and perpendicular to webs of girders 29; and On the other hand, two intermediate wheels 310a and 310b journalled respectively about axes 311a and 311b, vertical and fixed with respect to carriage A.

Carriage A supports two control drums 312a and 312b, the respective axes of which are parallel to girders 29 and located in the lower portion of carriage A.

A cable 316a is secured to the rod 350b of the rigid bar 301 of every transfer element 3, and this cable 316a passes successively over a wheel 318a freely rotatable about the axis of the pair of rollers 305a of said bar 301, over the return wheel 308b located at the opposite end and over the corresponding wheel 310b, to be finally secured to the corresponding control drum 312b and this in such manner that, when said control drum 312b rotates in the clockwise direction, cable 316a is unwound.

On the other hand a cable 316b is secured to the rod 350a of rigid bar 302. This cable 316b passes successively over a wheel 318b freely rotatable about the axis of the pair of rollers 305b, over the return wheel 308a located on the opposite side and over the corresponding intermediate wheel 310a, to be finally secured to the corresponding control drum 312a and this in such manner that, when said control drum 312a rotates in the clockwise direction, cable 316b is wound.

If control drums 312a and 312b are rotated in opposed directions, thus winding cable 316b on drum 312a and cable 316a on drum 312b, said cables undergo a pulling effort which moves connecting rods 306a and 306b toward the center of rigid bars 301 and 302 and therefore to shift transfer element 3 from its lower position to its upper position.

Inversely, if it is desired to shift transfer elements 3 from their upper position to their lower position, it suffices to release the pulling action exerted on cables 316b and 316a, which makes it possible for connecting rods 306a and 306b to move outwardly under the effect of the weight of transfer element 3, this action being, if necessary, completed by that of return springs 319.

In order to control the rotation of drums 312a and 312b the following means are used.

An endless chain 400a cooperates with a pinion 401a rotating together with control drum 312a, which chain 400a passes successively, when control drum 312a rotates in the clockwise direction, on the following pinions:

(a) Pinion 402a linked to the rod 403a of a hydraulic motor 404a;

(b) Pinion 405a fixed on a driving shaft 406 capable of turning in both directions, and (c) Pinion 407a linked to the end of a pulling spring 408a.

On the other hand, an endless chain 400b cooperates with a pinion 401b rotatable together with control drum 312b, which chain 400b passes successively, when control drum 312b rotates in the anticlockwise direction, on the following pinions:

(d) Pinion 402b linked to the rod 403b of a hydraulic motor 404b;

(e) Pinion 405b fixed on a driving shaft 406 capable of turning in two opposed directions; and (f) Pinion 407b linked to the end of a pulling spring 408b.

In FIG. 8, both of the hydraulic motors 404a and 404b are shown in the position where they are fed with liquid under pressure. Their actions upon chains 400a and 400b have caused the winding (therefore the tensioning) of cable 316b on control drum 312a and of cable 316a on control drum 312b.

It should be noted that, in this embodiment corresponding to a longitudinal parking of the vehicles, it is advantageous to act upon the lifting means of transfer elements 3 in such manner that the shifting thereof from lower to upper position, or inversely, takes place simultaneously.

As a matter of fact, in the case of longitudinal parking, simple and efficient means (such for instance as a U-shaped guide) may be provided for automatically placing the vehicle in the correct position.

Concerning now the motor means for shifting by translation the transfer elements 3 from carriage A to a parking area P, or inversely, they are advantageously constituted by driving shaft 406 actuated by a motor, for instance hydraulic motor 428.

Owing to such a mechanism, any rotation of driving shaft 406 in a given direction, for instance the clockwise direction, causes cable 316a to be wound up on control drum 312b and cable 316b to be unwound from control drum 312a. Transfer elements 3 are then moved toward the right.

On the contrary, if driving shaft 406 is rotated in the anticlockwise direction, cables 316a are unwound from control drum 312b and cables 316b are wound up on control drum 312a. Transfer elements 3 are then moved toward the left (FIG. 8).

In order to provide a correct winding of cables 316a and 316b on control drums 312a and 312b, it is advantageous to provide means for ensuring the translation of such control drums 312b and 312a when they are rotated.

For this purpose, control drum 312a is carried by a shaft 409a a portion of which is provided with a helical surface 410a, said shaft 409a driving control drum 312a through a sliding key 411a.

Likewise control drum 312b is mounted upon a shaft 309b a portion of which carries a helical surface 310b, said shaft 409a driving control drum 312b through a sliding key 411b.

It should be noted that, whatever be the embodiment that is adapted, as the transfer elements are connected together only through cables, the movements they must perform (shifting from lower to upper position or inversely, passage from the carriage to the parking areas or inversely) can be simultaneous only if all the cables controlling these different operations are correctly fixed and stretched. In particular, in case of breaking of one or several of said cables, the corresponding transfer element can no longer follow the movement of the other transfer elements.

In order permanently to control the positions of all the transfer elements, it is advantageous to make use of optical checking means. For instance, one side of the carriage may be provided with devices for producing light beams perpendicular to the girders and arranged in such manner that said beams can travel from one side to the other of the carriage, and then energize the photoelectric cells located on the other side, only when all the transfer elements occupy the following positions:

Lower position in the carriage,
Upper position in the carriage,
Upper position in the parking area located on the right,
Lower position in the parking area located on the right,
Upper position in the parking area located on the left, and
Lower position in the parking area located on the left.

In these conditions, if one of the transfer elements is accidentally offset with respect to the others, one of the photoelectric cells will cease to be energized so that a suitable signal is produced, which is capable of stopping the motor mechanism.

In a general manner, while the above description discloses what is deemed to be practical embodiments of the invention, said invention is not limited thereto as there might be changes made in the arrangement, disposition and form of the parts without departing from the principle of the invention as comprehended within the scope of the appended claims.

What I claim is:

1. A parking plant for vehicles which comprises, in combination:

a plurality of parking areas, a carriage movable with respect to said areas adapted to be brought along each of them, elongated parallel transfer elements carried by said carriage for shifting vehicles between said carriage and one of said areas, respectively, said transfer elements being movable with respect to said carriage, on the one hand vertically, so as to be able to occupy either of two positions with respect to said carriage, to wit a lower position, wherein said transfer elements are at most at the level of the top of said carriage, and an upper position, wherein said transfer elements are as above the top level of said carriage, and on the other hand horizontally, so as to be able to come onto a parking area, a plurality of parallel I-section girders, having their webs located in respective parallel vertical planes carried by said carriage and interposed between said transfer elements, respectively, whereby every transfer element is located between two of said girders, a plurality of parallel I-section girders of the same cross section as said first mentioned girders carried by each of said parking areas, having their webs located in the same respective parallel planes as those of said first mentioned girders when said carriage is located along said parking area, each transfer element comprising two rigid bars in line with each other and parallel to said girders and a link for linking said bars together, two pairs of rollers carried by every transfer element bar and having their axes perpendicular to the webs of the two girders between which said transfer element is located, the rollers of each pair being arranged to run on the upper faces of the lower flanges of said two last mentioned girders, respectively, a connecting rod having one end thereof pivoted about the axes of each of said rollers and the other end thereof pivoted to one end of one of said transfer element bar about respective horizontal axes, two positive means each for connecting one of the pairs of rollers of one of said bars with the other pair, said last mentioned means including the corresponding connecting rods, two pins carried in fixed position by said carriage and perpendicular to the webs of said girders, two return wheels, located below the respective ends of each of said transfer elements, journalled about said last mentioned pins, respectively, two pins carried in fixed position by said carriage, two intermediate wheels journalled about said two last mentioned pins, respectively, two control drums carried by said carriage and having their axes parallel to said girders, a wheel freely rotatable about the axis of the outer pair of rollers of one of said transfer element bars, a first cable secured at one end to one of said positive means, said cable passing successively over said last mentioned wheel, that of said return wheels located on the opposite side and the corresponding intermediate wheel, the other end of said cable being secured to the corresponding control drum, a wheel freely rotatable about the axes of the outer pair of rollers of the other of said transfer element bars, and a second cable secured at one end to the other of said positive means, said cable passing successively over said last mentioned wheel, that of said return wheels located on the opposite side and the corresponding intermediate wheel, the other end of said second cable being secured to the corresponding control drum.

2. A parking plant according to claim 1 comprising to move said transfer elements vertically between their upper and lower positions, at least one hydraulic motor adapted to pull both of said cables.

3. A parking plant according to claim 1 comprising, to move said transfer elements vertically between their upper and lower positions, two hydraulic motors operatively connected with said control drums to rotate them both in the directions pulling both of said cables simultaneously.

4. A parking plant according to claim 1 comprising, to move said transfer elements between said carriage and one of said parking areas, at least one hydraulic motor operatively connected with said control drums in respective directions such that, while one of them turns to wind up the corresponding cable, the other turns to unwind the corresponding cable, respectively.

References Cited

UNITED STATES PATENTS

| | | | |
|---|---|---|---|
| 2,647,647 | 8/1953 | Alimanestiano | 214—16.1 |
| 2,707,054 | 4/1955 | Alimanestiano | 214—16.1 |
| 2,752,051 | 6/1956 | Strahm | 214—16.1 |

FOREIGN PATENTS

| | | |
|---|---|---|
| 951,958 | 3/1964 | Great Britain. |
| 603,913 | 4/1960 | Italy. |

GERALD M. FORLENZA, *Primary Examiner.*

R. B. JOHNSON, *Assistant Examiner.*